(12) United States Patent
Mauro

(10) Patent No.: US 7,125,525 B2
(45) Date of Patent: Oct. 24, 2006

(54) DEVICE AND METHOD FOR PRODUCTION OF CARBON NANOTUBES, FULLERENE AND THEIR DERIVATIVES

(76) Inventor: Schiavon Mauro, Via Luxardo 38, Padova (Padova) (IT) I-35129

( * ) Notice: Subject to any disclaimer, the term of this patent is extended or adjusted under 35 U.S.C. 154(b) by 266 days.

(21) Appl. No.: 10/728,059

(22) Filed: Dec. 4, 2003

(65) Prior Publication Data

US 2004/0213727 A1  Oct. 28, 2004

(30) Foreign Application Priority Data

Dec. 11, 2002  (IT) .......................... PD2002A0316

(51) Int. Cl.
*B01J 19/08* (2006.01)
(52) U.S. Cl. ............. 422/186; 219/121.37; 219/121.48
(58) Field of Classification Search ................ 422/186; 219/121.37, 121.48
See application file for complete search history.

(56) References Cited

U.S. PATENT DOCUMENTS

| | | | | |
|---|---|---|---|---|
| 5,285,046 A | * | 2/1994 | Hansz .................... | 219/121.47 |
| 5,288,969 A | * | 2/1994 | Wong et al. ........... | 219/121.52 |
| 5,876,684 A | * | 3/1999 | Withers et al. ......... | 423/445 B |
| 6,517,913 B1 | * | 2/2003 | Cheung et al. ............. | 427/588 |
| 6,540,966 B1 | * | 4/2003 | Santilli .................. | 422/186.21 |
| 2003/0082094 A1 | * | 5/2003 | Loutfy et al. ............ | 423/447.3 |

* cited by examiner

*Primary Examiner*—Kishor Mayekar
(74) *Attorney, Agent, or Firm*—Thomas S. Baker, Jr.

(57) ABSTRACT

An apparatus and method for the production of nanotubes, fullerene and their derivatives where, in an environment where an inert gas flows at or below atmospheric pressure, a high frequency electromagnetic field is generated and a pure or doped graphite element is subjected to the electromagnetic field and heated to vaporization to form a plasma.

11 Claims, 4 Drawing Sheets

DEVICE AND METHOD FOR PRODUCTION OF CARBON NANOTUBES, FULLERENE AND THEIR DERIVATIVES

FIELD OF INVENTION

The present invention relates to device and method for producing carbon nanotubes, fullerene and their derivatives by continuous vaporization of substantially pure graphite rods, doped graphite rods or graphite rods compounded with other substances, in case injected in the vaporization zone.

BACKGROUND OF THE INVENTION

Since their recent discover and because of their unique structures and peculiar chemical-physical properties, carbon nanotubes, fullerene and their derivatives have been object of many studies and researches that demonstrated their profitable and innovative applications in many fields.

The main applications of these new nanomaterials could be: realization of structural materials with unique mechanical characteristics; production of nano-metric devices (nano-motor, nano-transistor, etc.); as additive for polymers; production of Field Emission Device, (flat panels for high resolution electronic displays); as "vehicles" for pharmaceutically active molecules; as hydrogen storage media to be used in fuel cells technology.

Nevertheless, nowadays many of these applications remain at the stage of preliminary studies or prototypes due to the lack of sufficient quantity of raw materials (nanotubes, fullerene and their derivative) having costs compatible for the development of these applications on an industrial scale. Furthermore, really the lack or the excessive cost of these materials represent a further obstacle to the research for other new applications.

During the last years, multi wall nanotubes (MWNT) or single wall nanotubes (SWNT), fullerene and their derivatives were and are produced utilizing several methods, among those the most important surely are that ones that have been demonstrated, really or in perspective, to be able to supply large amount of product at limited costs.

All the methods used until now may be divided in two categories, depending on the characteristics of the precursory material utilized.

The first category includes all the methods where the precursory material is constituted by a solid carbon-based material (graphite rods or carbon powder); the second category includes all the methods where the precursory material are in liquid or gas phase.

For all the methods pertaining to the first category, it is necessary to reach high temperatures (>3600 K) to vaporize the precursory material, which may be achieved in various ways. In the case of solid precursory material, as graphite rod, the main methods used may be resume as follow:
vaporization by arc discharge;
vaporization by laser ablation;
vaporization by concentration of solar energy;
vaporization by induction heating;
vaporization by direct current flow;
vaporization by sputtering;
vaporization by electronic beam bombardment.

The method of vaporization by inductive coupled plasma is used only in the case where the solid precursory material is constituted by carbon powders.

In the second category, i.e. comprehensive all the methods based on the decomposition of a precursory material (containing carbon) in liquid or gas phase (hydrocarbon, alcohol, ferrocene, etc.) it is possible to arrange the following ones:
methods of thermal decomposition of a precursory material in gas or vapour phase in presence of catalysts at low temperature (450–800° C.), or at high temperature (800–1200° C.), inside a chemical vapor deposition (CVD) reactor;
method for chemical vapor deposition enhanced by radio frequency plasma (PE-CVD);
method for chemical vapor deposition enhanced by microwave plasma (MP-CVD);
method named HIPco, i.e. a process in gas phase at high pressure with carbon monoxide as precursory material;
flame combustion method.

In spite of the many production methods above mentioned, only some of them are currently used for productions of considerable amounts for commercial purpose as well.

Therefore, at the present time, the prevalent production methods suitable for an effective commercialization of nanotubes, fullerene and their derivatives, are those listed as follow.

Pertaining to the first category, i.e. the methods that use solid precursory material, the arc discharge method is up to day the most common and spread, due to its intrinsic simplicity and to its low cost for the assembly of a production device.

By means of this method it is possible to produce nanotubes, fullerene and their derivatives. Thanks to this method, mainly devoted to research aims, many small enterprises arose for producing and commercializing: nanotubes SWNT (quite small with diameters from 0.6 to about 2 nm) and nanotubes MWNT (small with internal diameters from 0.6÷3 nm to about 20 nm of external diameter), fullerene and their derivatives.

The nanotubes produced in this manner are generally of good quality, with few structural defects and the MWNT are produced without the aid of catalysts.

Nevertheless, the arc discharge method presents two heavy limiting factors from the productivity point of view: i) it is not a continuous production method; ii) it is not a scalable method; in fact, with discharge currents over around 150A the production yield of the device decrease quickly, since the plasma jet speed becomes too high and, consequently, the time of permanence for the carbon clusters in the high temperature plasma is too short.

It is still possible to realize considerable productions by this method, not increasing the electric power of a single device, but arranging multiple devices in battery. In any case, the amount of solid material that it is possible to vaporize in a optimized device results generally less than 10 gr./h.

Pertaining to the methods classified in the second category, those starting from liquid or gas phase precursory material, and for the production of fullerene only, the method of low pressure flame combustion (method used by the companies Frontier Carbon Corporation—JP and Nano-C—USA) prevails over all the competitors for both productivity and yield. The CVD methods produce mostly MWNT with considerable dimensions (external diameters more than tens nano-meter).

Even if it has not yet begun the commercialization of products, Toray company—JP declared the development a new method based on catalytic decomposition of hydrocarbons on dispersed metallic particles in zeolytes for the synthesis of DWNT with external diameters between 1 and 3 nm.

The HIPco method is until now the only one (besides arc discharge method) able to produce SWNT in considerable quantity for selling, as well as research aims.

CNRI-Mitsui company—JP has recently announced a new CVD process for the production of SWNT named Alcohol Catalytic Chemical Vapour Deposition.

However, on the basis of which above described, it is clear that a new system for producing nanotubes, fullerene and their derivatives-flexible, able to be set up in a simple way only by changing the precursory material and the process parameters, with low plant and running costs, with a continuous automated production, with production yield largely higher than those possible with arc-discharge method, is of great interest. Such a new production system could be surely attractive for all that would autonomously produce many carbon-based nano-materials. By this innovative method it would be possible to realize little, distributed plants with costs truly competitive in respect to plants, e.g. as required for CVD methods, committed to production of a specific product and requiring very large scale industrial structures and considerable investments for their realization.

AIM OF THE INVENTION

It is a purpose of the present invention to provide a new device and a new process able to produce nanotubes, fullerene and their derivatives that usefully could go beyond the above mentioned, intrinsic production limits of the arc discharge method, maintaining the capability to produce all the kinds of carbon-based nano-structures by means of the same device.

It is another purpose of the present invention to provide a device and a method able to produce a large quantity of nanotubes, fullerene and their derivatives by an automatic, continuous, low costs and high yield process.

SUMMARY OF THE INVENTION

The purposes of the present invention are reached by means of a device and a method for synthesizing nanotubes, fullerene and their derivatives.

The device described in the present invention uses graphite rods, substantially pure, doped or compounded with other solid or/and liquid substances, as precursory material. These rods are inserted one after another inside a vacuum chamber.

The insertion of the graphite rods inside the vacuum chamber is realized in such a way to maintain vacuum-tight inside the chamber.

Advantageously, it is possible to utilize; i) graphite rods with ends appropriately machined to stack up the rods in a way that the previous rod sustains and pushes the next one inside the chamber.

ii) standard un-machined rods, where the final remains, not any more sustained during advancement, is free to fall down on the bottom of the vacuum chamber, to be pick up during the process, without hampering the continuous process.

It is advantageous to utilize a vacuum chamber having one port for the inlet of an inert gas through a pressure and flow intercepting and regulation system, and another port, on the opposite side, for inert gas evacuation. From the same evacuation port it is also possible to pump down the vacuum in the chamber and, during the process, to suck away the inert gas that carries the reaction products.

Consequently, by these two ports it is advantageously possible to control with precision both inert gas flow and pressure inside the chamber.

According to the present invention, after that the end of the first rod has been inserted in the chamber, the vacuum is produced to eliminate any trace of atmospheric gases that may compromise the productive process.

Successively, an injected flow of inert gas is regulated until to reach a settled pressure (ranging from $10^4$ to $10^5$ Pascal) suitable for the beginning of the graphite rods vaporization process. During the linear movement of the graphite rod and during the vaporization phase the inert gas flow and pressure in the chamber are maintained constant. Inside the chamber, the rod starts moving at constant speed toward an inductor coaxially positioned along the movement axis.

In the same time, a high frequency generator supplies the inductor, which produces a strong high frequency electromagnetic field around and, mostly, in its core.

When this strong high frequency electromagnetic field invests the rod, starting from its end, it intensely begins to heat because of the powerful internally induced eddy currents. Subsequently, going on with the linear movement of the rod inside the inductor, the vaporization process occurs.

During the linear movement and vaporization phase the inert gas flow into the chamber is hold at constant values suitable for process achievement (gas flow ranging from 0,5 e 10 l./min. for each gram/minute of rod material vaporized during the process).

Moreover, the high frequency electromagnetic field, besides to produce the continuous graphite rod vaporization, triggers and maintains an inductive plasma. Such plasma settles itself partially inside and beyond the inductor, in some measure winding the rod surface facing the inductor.

Setting suitable values for the process parameters, as following indicated in the detailed description paragraph (such as graphite rod diameter, rod speed, inert gas pressure and flow into the chamber, inductor working frequency and the specific surface power transferred to rod), characteristic temperature conditions and related plasma resistivity values are obtained, where the high frequency electromagnetic field is still able to sufficiently penetrate into the graphite rod to continue its heating and vaporization.

Plasma trigging, and the simultaneous heating by eddy currents, allows to obtain to advantages in the production process. The main one consists in the fact that the graphite vapors, leaving the vaporizing rod, are immediately immersed into the high temperatures plasma, and the thermodynamical environment for subsequent nanotubes, fullerene and their derivatives formation is favored. On the other hand, the plasma sheath on the rod surface shields the radiating heat coming from the graphite parts that are near to vaporization, so reducing the radiating losses that, otherwise, being very high at over 3600 K, could heavily decrease the energetic efficiency of the system.

A further significant yield improvement of such a device, mainly for nanotubes production, besides fullerene and their derivatives production, is attained using a following second inductor placed coaxially with the first one. This second inductor is placed externally to the chamber around a insulating tube, which has one side tighten to the vacuum chamber and the other one to the evacuation port.

Alternatively, the second inductor, may be placed inside the vacuum chamber, in any case around an insulating feedthrough tube through the vacuum chamber. Such second inductor, supplied by another high frequency generator, creates a further inductive plasma that both vaporizes residual graphite grains dislodged in solid phase from the rod and to thermally energizes and dissociates carbon clusters.

With suitable inert gas flow values (gas flow ranging from 0,5 e 10 l./min. for 1 gr./min. of rod material vaporized during the process) the carbon particles firstly reside in the plasma core and then flow through a cooling thermal transient along the plasma tail for a sufficient time to allow their recombination in nano-structures.

BRIEF DESCRIPTION OF THE DRAWINGS

FIG. 2 furthermore illustrates the inductive plasma zone 14 which develops after the inductor 12 inside the insulating tube 11.

DESCRIPTION OF PREFERRED EMBODIMENTS

Figure 1:
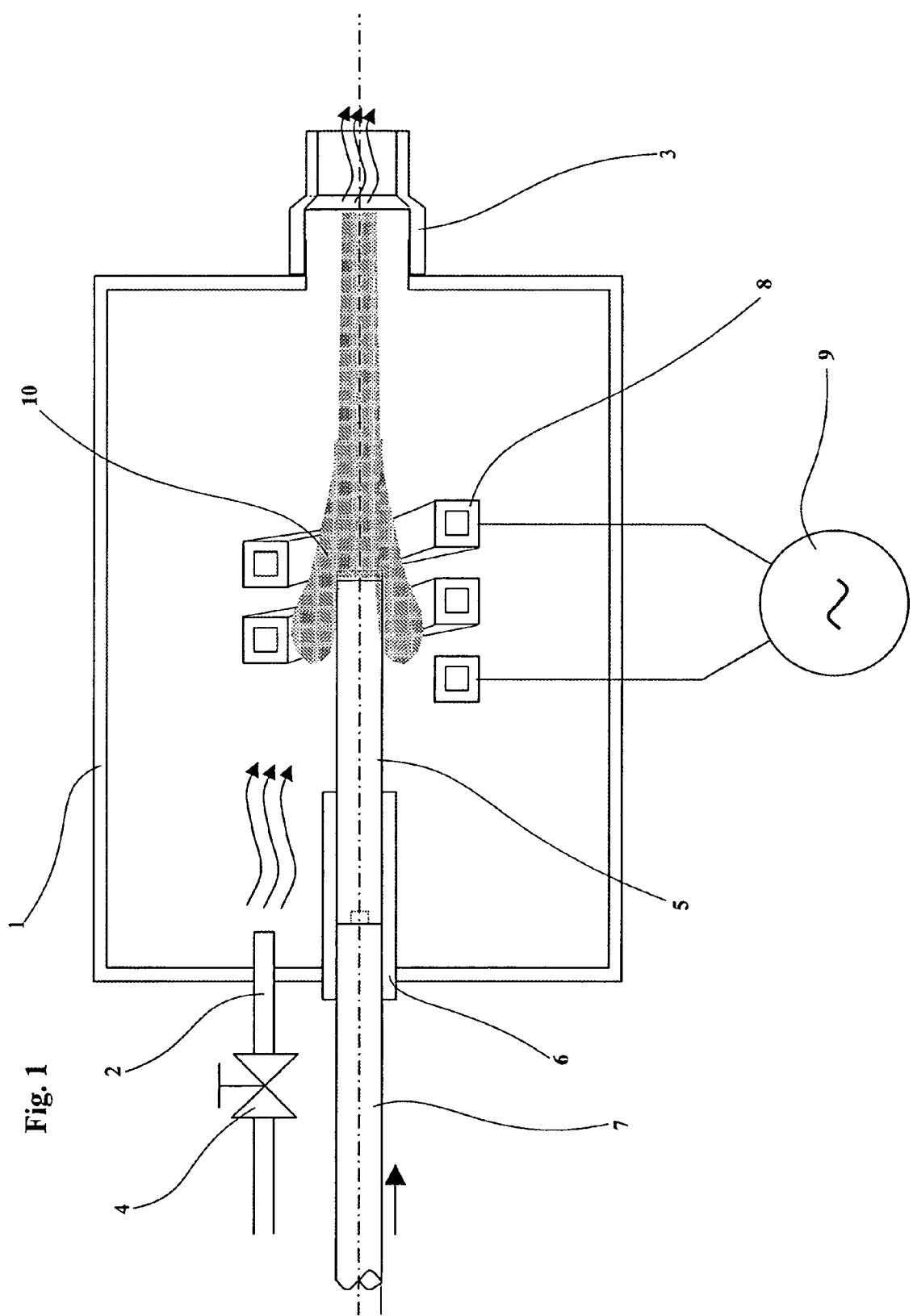
FIG. 1 shows a schematic drawing of device for the production of nanotubes, fullerene and their derivatives with vacuum chamber 1, inert gas inlet port 2, inert gas and process out-coming products evacuation port 3, inert gas flow intercepting and pressure regulation valve 4, a graphite rod 5 threaded in the hole of a bush for vacuum-tight, centering and support 6 with threaded in the tail another graphite rod 7, an induction heating inductor 8 coaxially placed to the graphite rod 5 inside the vacuum chamber 1, the high frequency generator 9 which supplies the inductor 8, the plasma 10 which stays inside the inductor 8 and afterward the graphite rod 5.

With reference to the FIG. 1 it is described as follow in detail a novel device and method for producing nanotubes, fullerene and their derivatives according to the present invention.

The device provides that a graphite rod, substantially pure, doped or compounded with other solid or/and liquid substances, as precursory material, is partially inserted inside a vacuum chamber 1.

The insertion of the graphite rod 5 inside the vacuum chamber 1 is realized through the bush 6 having also the functions of centering and support of the graphite rod 5.

By means of the bush 6 is so realized the vacuum-tight inside the vacuum chamber 1 with the graphite rod partially inserted inside the same.

Advantageously, it is possible to utilize graphite rods with ends appropriately machined to stack up the rods in a way that the previous rod sustains and pushes the next one inside the vacuum chamber; alternatively standard un-machined rods, where the final remains, not any more sustained from the bush 6 during advancement, is free to fall down on the bottom of the vacuum chamber 1 without hampering the continuous process.

It is advantageous to utilize a vacuum chamber 1 having from one side one port 2 for the inlet of an inert gas through a flow intercepting and pressure regulation valve 4 and a port 3, on the opposite side, for inert gas evacuation. From this evacuation port 3 it is also possible to pump down the vacuum in the chamber 1 and, during the process, to suck away the inert gas that carries the reaction products.

Consequently, by these two ports 2,3, it is advantageously possible to control with precision both inert gas flow and pressure inside the chamber 1.

According to the present invention, after that the first rod 5 has been partially inserted vacuum-tight in the chamber 1 through the centering and support bush 6, having previously closed the intercepting and regulation valve 4, the vacuum is produced inside the vacuum chamber 1 to eliminate any trace of atmospheric gases that may compromise the productive process.

According to the present invention, the intercepting and regulation valve 4 is successively opened and an inert gas is admitted into the vacuum chamber 1 through the inlet port 2, this inert gas may go out passing through the evacuation port 3.

It is so realized an inert gas flow along horizontal axis of vacuum chamber 1 and graphite rod 5.

Inert gas pressure and flow inside the vacuum chamber 1 may be changed both by the intercepting and regulation valve 4 and changing the suction level applied to the evacuation port 3.

Successively, an injected flow of inert gas is regulated until to reach a settled pressure (ranging from $10^4$ to $10^5$ Pascal) and flow (gas flow ranging from 0,5 and 10 l/min. for 1 gr./min. of rod material vaporized during the process) suitable for the beginning of the graphite rods vaporization process.

During the linear movement and vaporization phase of the graphite rod the inert gas flow and pressure into the vacuum chamber 1 are hold at constant values.

The graphite rod 5, previously partially inserted inside the vacuum chamber 1, starts moving toward the inductor 8 coaxially positioned along the movement axis.

In the same time to the start movement of the graphite rod 5, a high frequency generator 9 supplies the inductor 8 that produce a strong high frequency electromagnetic field around and, mostly, in its core.

Arriving near the inductor 8 the graphite rod 5 is invested from a high frequency electromagnetic field generated from the same and, starting from its end near the inductor 8, it intensely begin to heat because of the powerful internally induced eddy currents.

Using, for instance, the following suitable conditions of process the continuous vaporization of the graphite rod 5 occurs with a 6 mm diameter graphite rod which goes on at a constant speed not higher than 1.2 mm./sec. inside the inductor 8 supplied from the high frequency generator 9 working at a frequency value around 800 kHz that, by the electromagnetic field generated from the inductor 8 transmit to the graphite rod 5 a surface specific power at least of 2.5 $kW/cm^2$ (2.5 kW transmitted to the graphite rod for each square centimeter of graphite rod surface faced to the inductor).

During the crossing of inductor 8, with the above mentioned values for process parameters (graphite rod diameter, progress speed of the rod, inert gas pressure inside the chamber, inert gas flow in the chamber, inductor working frequency, specific power transmitted to the rod) it takes place a situation where, besides to produce the continuous graphite rod 5 vaporization, an inductive plasma 10 triggers and maintains around the heating end of the graphite rod 5 and afterward the same.

Such plasma settles itself partially inside and beyond the inductor 8, in some measure winding the graphite rod 5 surface facing the inductor 8. Characteristic temperature conditions and related plasma 10 resistivity values are obtained, where the high frequency electromagnetic field is still able to sufficiently penetrate into the graphite rod 5 to continue its heating due to eddy currents and its continuous vaporization.

Plasma 10 trigging, and the simultaneous holding heating by eddy currents, allows to obtain to advantages in the production process. The main one consists in the fact that the graphite vapours, leaving the vaporizing rod 5, are immediately immersed into the high temperatures plasma 10, and the thermodynamical environment for subsequent nanotubes, fullerene and their derivatives formation is favoured. On the other hand, the plasma sheath on the graphite rod 5 surface shields the radiating heat coming from the graphite parts that are near to vaporization, so reducing the radiating losses that, otherwise, being very high at temperatures over 3600 K, could heavily decrease the energetic efficiency of the system.

A further significant yield improvement of such a device, mainly for nanotubes production, besides fullerene and their derivatives production, is attained using a following second inductor 12 placed coaxially with the first one (inductor 8).

By means of this second inductor 12 it is possible to produce the inductive plasma 14 as follow described.

Figure 2:
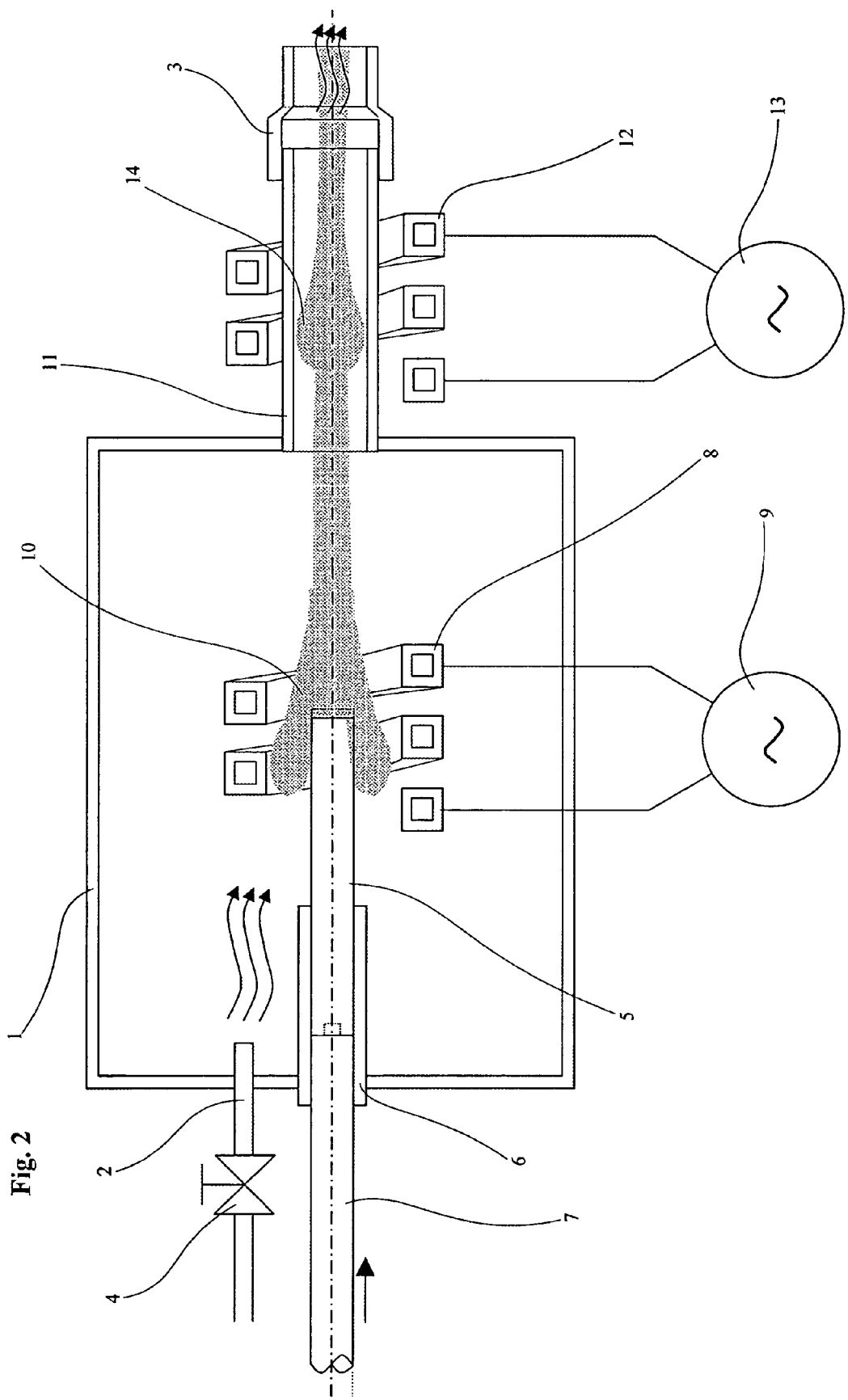
FIG. 2 shows the schematic drawing of the FIG. 1 integrated with an insulating material tube 11 with one side tightened to the vacuum chamber 1 and the other one to the evacuation port 3. The inductor 12 is coaxially placed around the insulating material tube 11 and is connected to the high frequency induction heating generator 13.

With reference to the FIG. 2 the inductive plasma 14 is obtained using a second inductor 12 placed preferably at not more than 250 mm afterward the inductor 8 and always placed coaxially to the graphite rod 5, externally to the vacuum chamber 1, around an insulating tube 11, which has one side tighten to the vacuum chamber 1 and the other one to the evacuation port 3.

Subsequently to the evacuation phase of air present at the beginning in the chamber 1, before that, with the inert gas inlet, the pressure in the vacuum chamber 1 reaching 1000 Pascal, this inductive plasma 14 is triggered supplying the inductor 12 by the high frequency generator 13. After the triggering at low pressure, this inductive plasma 14 is hold on for all the time of production process, by the electromagnetic field generated from the inductor 12 supplied from the high frequency generator 13.

Figure 3:
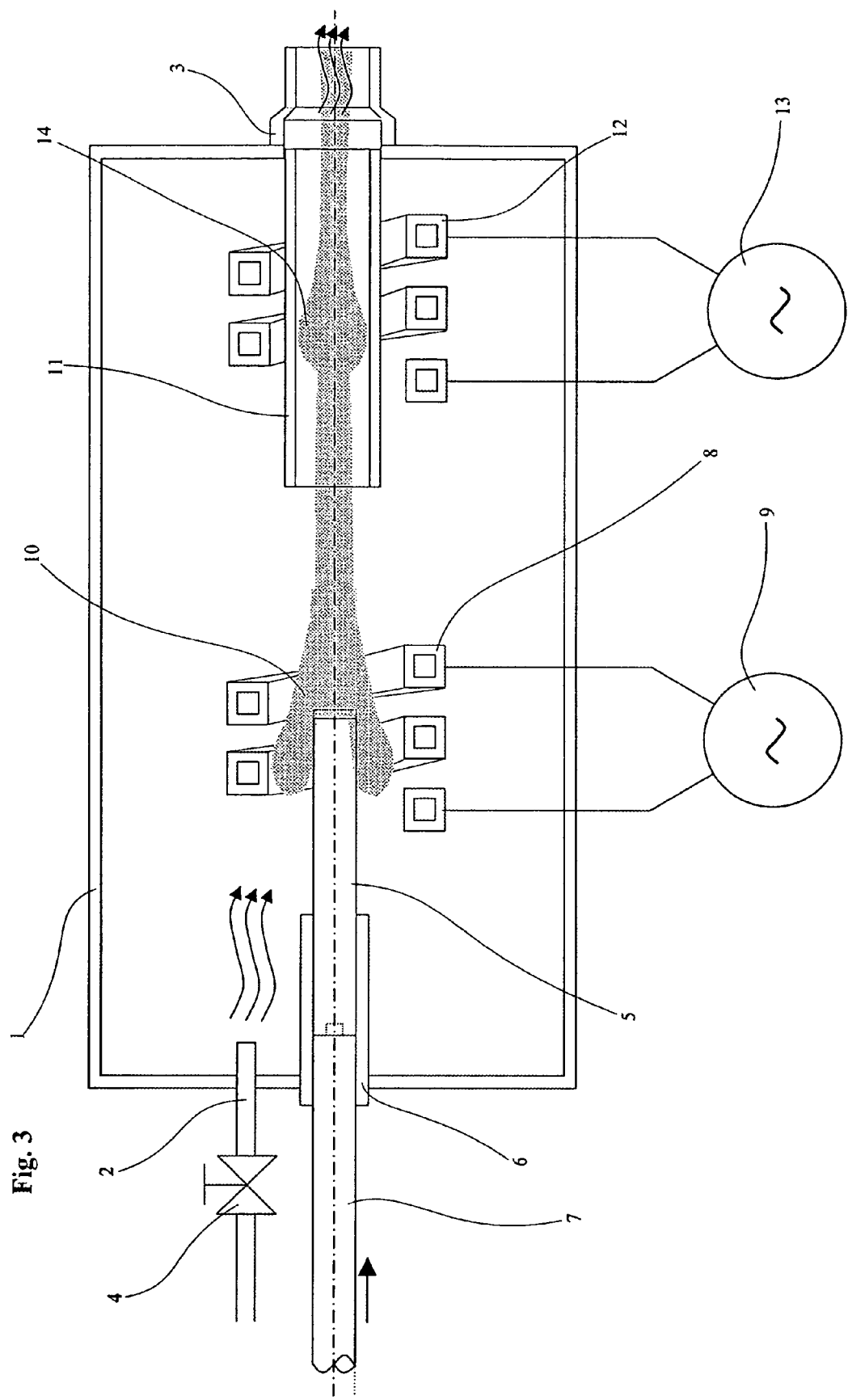
FIG. 3 shows the schematic drawing of the FIG. 2 where the inductor 12 and the insulating material tube are placed inside the vacuum chamber 1 and where the evacuation port 3 has been tighten on the vacuum chamber wall.

Alternatively, this inductor 12, as represented in FIG. 3, may be placed inside the vacuum chamber 1, in any case around an insulating feed-through tube 11 through the vacuum chamber 1.

Such second inductor 12, supplied by the high frequency generator 13, creates a further inductive plasma 14 that both vaporizes residual graphite grains dislodged in solid phase from the graphite rod 5 and to thermally energizes and dissociates carbon clusters.

With suitable inert gas flow values (gas flow ranging from 0,5 e 10 l./min. for 1 gr./min. of rod material vaporized during the process) the carbon particles firstly reside in the plasma 14 core and then flow through a cooling thermal transient along the plasma 14 tail for a sufficient time to allow their recombination in nano-structures.

Alternatively to the pure graphite rod, used to produce fullerene and/or multi wall nanotubes, to allow single wall nanotubes production a doped graphite rod, or a hollow rod filled with graphite and transition metal powders as catalysts, is used.

In the case where, in addition to pure fullerene, considerable amount of fullerene derivatives (endohedral-, esahedral-, ethero-fullerene) are required, according to the present invention, is useful to dope or to add to graphite rods with solid and/or liquid substances.

It is also possible, according to the present invention, by an injection device 15, to inject solid (powders), liquid or gaseous substances into the graphite rod vaporization zone.

Afterwards the evacuation port 3, a filtering and collecting device, to gather the products (nanotubes, fullerene and their derivatives) carried by the inert gas, is provided, so advantageously realizing with this configuration a continuous production system. With this arrangement it is not necessary to stop the process to collect the produced nanotubes, fullerene and derivatives, since they are carried out of the chamber 1 with the inert gas flow and gathered by the collecting device placed after the synthesis device.

What has been described for the head of the graphite rod 5 repeats continuously for all the graphite rod 5 material that crosses the inductor 8.

Figure 4:
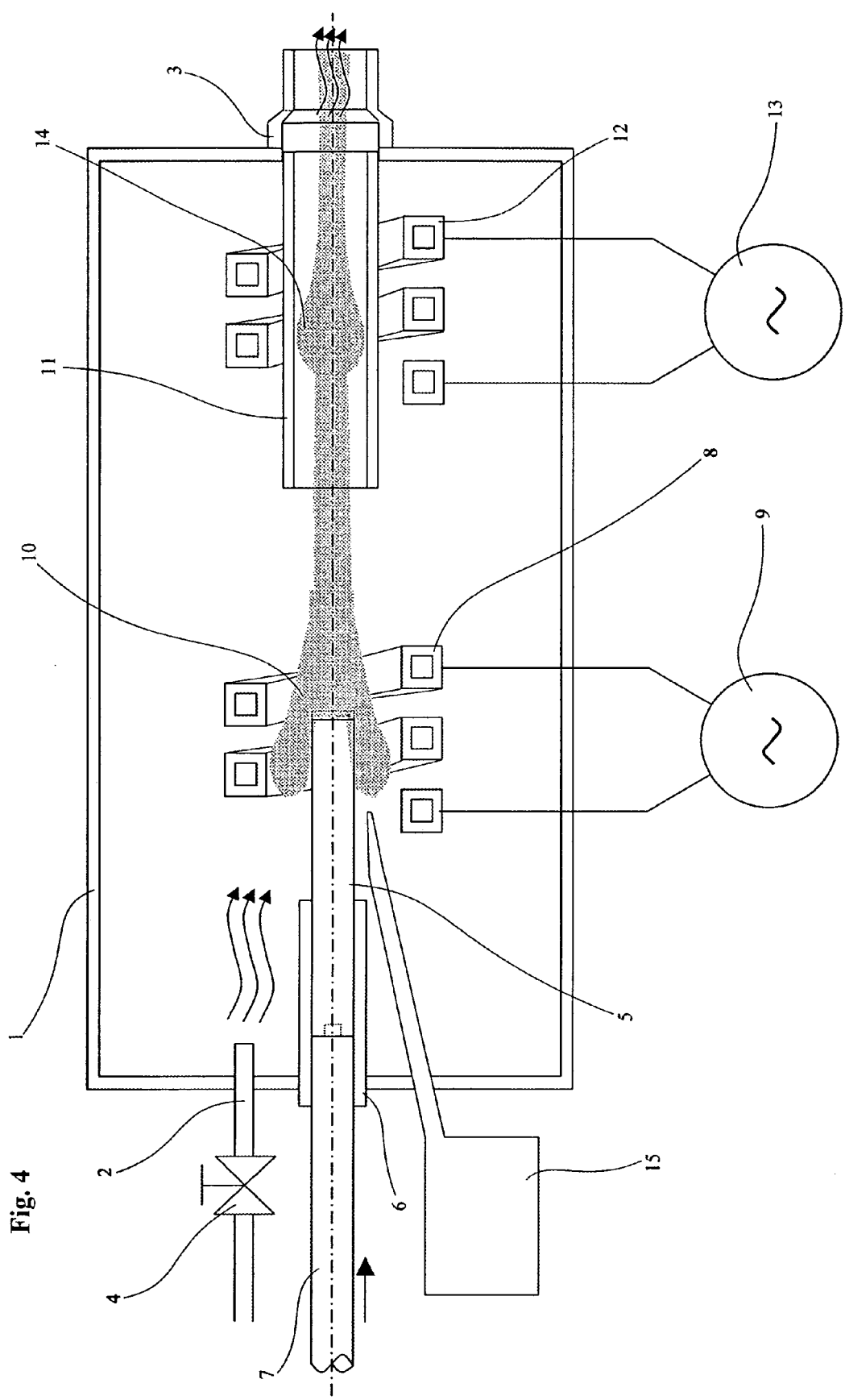
FIG. 4 shows the schematic drawing of the FIG. 3 integrated with a injection device 15 for powders, liquids or gas inside the inductor 8.

Furthermore, as showed the schematic drawing of the FIG. 4, it is possible to displace inside the vacuum chamber 1 an injection device 15 that may convey powders, liquids or gas in the graphite rod 5 vaporization zone inside the inductor 8.

This injection device 15 has the object to supply with further reagents or catalysts the vaporization zone in order to promote in preference nanotubes and fullerene derivatives synthesis.

The following examples describe the preferred embodiments of the present invention, with description of the apparatuses, procedures and results of particular and representative runs.

The examples are represented for illustrative purposes only, and are not intended as a restriction on the scope of present invention.

EXAMPLE 1

Fullerene and multi wall nanotubes were produced using the device showed in FIG. 1. As precursory material were utilized stacked up graphite rods with a purity grade not less than 99.9% and with a diameter of 6 mm.

The graphite rods were vacuum-tight inserted through a bush inside a inox steel vacuum chamber until that the head of the first rod inserted arrived near the first inductor.

After that the vacuum was made inside the chamber (vacuum limit reached 1 Pascal) inert gas argon was admitted until to arrive at a fixed pressure value inside the chamber of 50.000 Pascal with an inert gas flow of 20 l/min.

For the graphite rod continuous vaporization it was utilized the electromagnetic field generated from an inductor with length 27 mm, internal diameter 16 mm, with 4 insulated coils made of electrolytic copper tube (tube side of 6 mm and thickness of 1 mm, cooling inside by demineralized water).

This inductor was supplied from a high frequency generator, equipped with a charge adaptor, working at a resonance frequency of about 800 kHz.

The high frequency generator was turned on with the empty inductor without the graphite rod, the generator was regulated to supply in the no load condition a continuous power (plate power) of 22.5 kW (anodic voltage 9 kV, anodic current 2.5A)

Subsequently the graphite rods went on at a constant speed of 1.2 mm/sec.

The graphite rod continuous vaporization took place at a distance of about 22 mm from the inlet section inside the inductor and in presence of a plasma sheath on the head of the rod that continued afterward the inductor.

During the continuous vaporization process the generator supplied a continuous power (plate power) of 36 kW (anodic voltage 9 kV, anodic current 4A).

EXAMPLE 2

Single wall nanotubes were made using the device showed in FIG. 2 where a second inductive plasma was generated with a second inductor. The process realized in this second example was absolutely the same described in the example 1 with the only following exceptions: i) it was utilized a second inductor, made of electrolytic round copper pipe, external diameter of 10 mm and thickness of 1 mm, cooled inside by demineralized water; this second inductor was long 50 mm, made with 3 coils with internal diameter 50 mm supplied from a high frequency generator working at about 10.5 MHz; the inductor was placed coaxially to a silicon nitride tube with an external diameter of 40 mm and a thickness of 4 mm cooled by distilled water;

ii) graphite rods as those utilized in the example 1 were used but in this case the graphite rods were drilled along the axis and the holes filled with a mixture of catalysts and graphite powder subsequently compacted.

Catalysts metals used were cobalt and nickel in the ratio of 3 to 1, the content of catalysts with respect to the total weight of the doped rods with this ratio was in the range of 11%.

At the end of the vacuum chamber evacuation (vacuum limit reached 1 Pascal), the high frequency generator 13 that supplied the inductor 12 was turned on for triggering the inductive plasma 14 and it was hold on until the end of the production process.

During the continuous vaporization process the generator 13 supplied a continuous power (plate power) of 8.4 kW (anodic voltage 6 kV, anodic current 1.4A).

EXAMPLE 3

Fullerene derivatives and fullerene were produced using the device showed in FIG. 1 with the same parameters described in the example 1. In this case the only difference respect to the example 1 was the precursory material used.

As precursory material were used graphite rods with purity grade not less than 99.9% with a diameter of 6 mm, previously submerged in distilled water for a period of 24 hours.

The invention claimed is:

1. A device for the production of nanotubes, fullerene and their derivatives comprising:
    a vacuum chamber 1 having an input port 2 and an evacuation port 3;
    a graphite element 5 mounted in said vacuum chamber 1;
    vaporizing means for vaporizing said graphite element 5 from said graphite element 5 and simultaneously forming a high temperature plasma around said graphite element 5;
    said vaporizing means comprising an inductor 8 mounted inside said vacuum chamber 1 and a high frequency power generator 9 operatively connected to said inductor 8 to create a strong high frequency electromagnetic field around and in a core of said inductor 8 with eddy currents; and
    an inert gas source delivered to flow around said inductor 8 and said graphite element 5.

2. The device for the production of nanotubes, fullerene and their derivatives of claim 1 further comprising:
    second vaporizing means for vaporizing said graphite element 5 from said graphite element 5 and simultaneously forming a second high temperature plasma around said graphite element 5;
    said second vaporizing means comprising a second inductor 12 mounted inside said vacuum chamber 1 and a second high frequency power generator 13 operatively connected to said inductor 12 to create a second strong high frequency electromagnetic field around and in a core of said inductor 12 with eddy currents.

3. The device for the production of nanotubes, fullerene and their derivatives according to claim 2, wherein for the collection of nanotubes, fullerene and their derivatives a device is installed at the exit of evacuation port 3.

4. The device for the production of nanotubes, fullerene and their derivatives according to the claim 1, wherein the graphite element 5 is formed from at least two rods 5,7, said rods being shaped in a such way to stack up and to support themselves.

5. The device for the production of nanotubes, fullerene and their derivatives according to the claim 1, further comprising an injection device 15 for injecting powders and/or liquid or gas inside the inductor 8.

6. The device for the production of nanotubes, fullerene and their derivatives according to claim 1, wherein for the collection of nanotubes, fullerene and their derivatives a device is installed at the exit of evacuation port 3.

7. The device for the production of nanotubes, fullerene and their derivatives according to claim 1, wherein the graphite element 5 is made up of graphite with a purity not lower than 90%.

8. The device for the production of nanotubes, fullerene and their derivatives according to claim 1, wherein the graphite element 5 is doped or added with other substances solid and/or liquid.

9. The device for the production of nanotubes, fullerene and their derivatives according to the claim 8, wherein the graphite element 5 includes catalyst metal.

10. The device for the production of nanotubes, fullerene and their derivatives according to the claim 9, wherein the graphite element 5 includes catalyst metal selected from the group consisting of Co, Ni, Sc, V, Cr, Fe, Cu, Y, Zr, Nb, Mo, Pd, Ta, W, Au, Th, U, La, Ce, Pr, Nd, Gd, Tb, Dy, Ho, Er, Tm, Lu.

11. The device for the production of nanotubes, fullerene and their derivatives according to the claim 1, wherein the output of said high frequency generator 9 has a frequency value of approximately 800 kHz and the electromagnetic field generated around the inductor 8 transmits to graphite element 5 a power of approximately 2.5 kW for each square centimeter of graphite element surface faced to the inductor.

* * * * *